US009669503B2

(12) United States Patent
Schneider et al.

(10) Patent No.: US 9,669,503 B2
(45) Date of Patent: Jun. 6, 2017

(54) WORK SPINDLE HAVING A SOLID-BODY JOINT

(75) Inventors: Gunter Schneider, Marburg (DE); Helwig Buchenauer, Dautphetal-Buchenau (DE); Ulf Börner, Marburg (DE)

(73) Assignee: Schneider GMBH & Co. KG, Fronhausen (DE)

( * ) Notice: Subject to any disclaimer, the term of this patent is extended or adjusted under 35 U.S.C. 154(b) by 909 days.

(21) Appl. No.: 13/881,399

(22) PCT Filed: Oct. 25, 2011

(86) PCT No.: PCT/EP2011/068672
§ 371 (c)(1),
(2), (4) Date: Jul. 8, 2013

(87) PCT Pub. No.: WO2012/055877
PCT Pub. Date: May 3, 2012

(65) Prior Publication Data
US 2013/0276601 A1    Oct. 24, 2013

(30) Foreign Application Priority Data
Oct. 25, 2010   (DE) ........................ 10 2010 049 267

(51) Int. Cl.
*B23Q 1/01* (2006.01)
*B23Q 1/34* (2006.01)
(Continued)

(52) U.S. Cl.
CPC ................ *B23Q 1/015* (2013.01); *B23B 5/36* (2013.01); *B23Q 1/34* (2013.01); *B23Q 1/52* (2013.01);
(Continued)

(58) Field of Classification Search
CPC .. B23B 5/36; B23Q 1/015; B23Q 1/34; B23Q 2210/002; B23Q 1/52
See application file for complete search history.

(56) References Cited

U.S. PATENT DOCUMENTS 5,947,658 A * 9/1999 Eysel ................ B23B 29/03457
408/147
6,170,367 B1   1/2001 Keller et al.
(Continued)

FOREIGN PATENT DOCUMENTS

DE   10 2005 057 725 A1   6/2007
DE   20 2010 007 456 U1   11/2010
WO      2011 077127 A2   6/2011

OTHER PUBLICATIONS

Precitech Inc., Machine manual, Precitech Nanoform 200/Nanoform 300, Keen, New Hampshire, USA, pp. 14-15.

*Primary Examiner* — Sara Addisu

(57) ABSTRACT

A subassembly with a supporting element for a machine bed of a lathe, and of a machining unit which is arranged on the supporting element and has a machining axis, wherein a solid-body joint, via which the machining unit is arranged in a movable manner on the supporting element, is provided. A lathe for plastics spectacle lenses, having a machine bed, having a tool mount or workpiece mount which is arranged at least indirectly on the machine bed, and having a subassembly which is arranged at least indirectly on the machine bed, wherein the workpiece and the tool can be oriented in relation to one another via the solid-body joint.

19 Claims, 2 Drawing Sheets

(51) Int. Cl.
*B23Q 1/52* (2006.01)
*B23B 5/36* (2006.01)

(52) U.S. Cl.
CPC ..... *B23Q 2210/002* (2013.01); *Y10T 82/2566* (2015.01)

(56) References Cited

U.S. PATENT DOCUMENTS

| | | | | |
|---|---|---|---|---|
| 6,945,147 B2 * | 9/2005 | Sakashita | ................ | B23Q 1/28 408/234 |
| 2007/0107567 A1 * | 5/2007 | Ehnes | .................... | B23B 27/20 82/1.11 |
| 2015/0128773 A1 * | 5/2015 | Schneider | ............... | B24B 13/00 82/1.11 |

* cited by examiner

WORK SPINDLE HAVING A SOLID-BODY JOINT

FIELD OF THE INVENTION

The invention relates to a subassembly consisting of a supporting element for a machine bed of a lathe for spectacle lenses made of plastic and of a machining unit which is arranged on the supporting element, such as a work piece spindle or a tool holder for a turning tool.

BACKGROUND OF THE INVENTION

A tool mount with a solid-body joint is already known from the machine manual "Precitech Nanoform® 200/Nanoform® 300" of Precitech Inc., Keene, N.H., USA, pages 14-15. In order to adjust the turning tool blade to the center of rotation, the tool mount has a fine adjustment that is arranged opposite the tool in relation to the axis of rotation of the solid-body joint.

A spindle drive is known from DE 20 2010 007 456 U1, which thanks to the use of piezo-elements assures a fine adjustment motion superimposed on the spindle motion. The piezo-elements result in a displacement of the one-sided bearing of the spindle contrary to a clamping force of disk springs or solid-body joints, for example, and thus ensure a movement of the spindle in its longitudinal direction corresponding to the deformation of the piezo-element. On the other hand, the use of the mentioned solid-body joint as a joint for the swiveling of the work piece or tool is not described.

This is a typical example of the use of a solid-body joint. What is characteristic is the adaptation of the solid-body joint to the tool mount. Since the tool mount with the tool has a relatively small mass, the force to be absorbed by the fine adjustment is predominantly attributable to the deformation of the solid-body joint. The weight of the tool mount with the tool is negligible.

Machine tools, especially nonround lathes for the fabrication of plastic lenses or spectacle glasses, have become increasingly dynamic in the past, so that in the meantime highly dynamic machining processes with oscillation frequency of around 100 Hz are common at the leading manufacturers.

Alternatively to the use of a solid-body joint for the height adjustment of the tool there is known the use of a tilted linear axis for the tool. Thanks to the tilting, not only a feed motion but also a motion component in the direction perpendicular to this is possible, so that the height of the tool can be adjusted. But this comes with the drawback that changes in the tool position attributable to a heat-related expansion of the tool drive unit will affect two position values, so that a continual calibration goes along with temperature change.

SUMMARY OF THE INVENTION

The problem of the invention is to configure and arrange a subassembly for a high-speed lathe having a solid-body joint so that a highly dynamic machining is possible.

The problem is solved according to the invention in that a solid-body joint is provided, by which the machining unit is arranged so that it can be pivoted or tilted on the supporting element. The problem is also solved by a lathe with such an articulated machining unit.

The arrangement of the solid-body joint on the machining unit not only assures the orienting of the relative position between the machining unit, such as a work piece spindle, and the supporting element, but also the orienting between the machining unit and the tool mount on the lathe bed, such as a linear motor or the turning tool. Furthermore, in the case when the machining unit is configured as a work piece spindle, it is possible to couple the tool mount or tool drive to the lathe bed with very stiff rigidity, because an additional adjusting element, such as a solid-body joint, is no longer needed. This enables an extremely precise nonround machining of the work piece, despite the tool masses moving in highly dynamic manner.

The solid-body joint serves to orient the relative position between the tool, configured as a turning tool, and the rotating work piece, so that the tip of the turning tool can be moved exactly through the center of rotation of the work piece. When the machining unit is a work spindle, the solid-body joint can be used to adjust the relative position to a tool mount or a turning tool. When the machining unit is a tool mount or turning tool, the solid-body joint can be used to adjust the relative position to a work spindle or the work piece. Accordingly, the solid-body joint can be provided at the work piece or the tool, in order to realize the relative position between tool and work piece.

In the following specification, the solid-body joint is arranged at the work piece as an example, so that the machining unit is a work spindle, which can be oriented relative to the lathe bed, and thus relative to the tool mount or a tool drive. A coupling of the solid-body joint to the tool would be equally possible.

It can also be advantageous for this if the solid-body joint has an axis of articulation and a pivot radius R and serves for the orienting of the relative position between the machining unit, such as the work spindle, and the supporting element. The axis of articulation forms the origin of the pivot radius, which extends perpendicular to the axis of articulation. The work spindle is mounted on the supporting element so that it can pivot indirectly via the solid-body joint, ensuring the relative position between the work spindle and the supporting element, especially in the direction of a normal to the surface of the supporting element.

Moreover, it can be advantageous for the machining unit such as the work spindle to be coupled to an actuator, by means of which movement about the solid-body joint is possible. To initiate the movement of the work spindle and the pivoting part of the solid-body joint, the actuator is directly connected to the work spindle. Alternatively, a coupling of the actuator to the movable part of the solid-body joint is also conceivable. However, the design space considerations in the region of one side of the work spindle would be of great importance here. As a rule, very little free space is available around the work spindle to permit an integration of the actuator.

It can also be advantageous if the machining unit, such as the work spindle, is arranged between the solid-body joint and the actuator in regard to the direction of the pivot axis R and can move by means of the actuator in a direction perpendicular to the pivot axis R. The following advantages come with arranging the work spindle between the solid-body joint and the actuator. First, the point of attack of the actuator has a longer lever arm than would be the case for a point of attack at the height of the work spindle axis. This entails a relatively slight actuator force to overcome the countervailing force due to the solid-body joint and the gravity of the work spindle. Secondly, the adjustment travel of the actuator is proportionately larger than the adjustment travel of the work spindle axis—the ratio of the actuator pivot radius to the work spindle axis pivot radius is critical—so that a transmission ratio greater than 1 is ensured with regard to the adjustment movement of the work spindle axis, and therefore a gear reduction. This comes with increased precision, since the possible tolerances occurring at the actuator are only transferred to the positioning of the work spindle axis with the aforesaid reduction ratio. The larger the ratio between the pivot radius of the actuator and the pivot radius of the work spindle, the larger said transmission ratio and also the leverage of the actuator.

It can be advantageously provided that the machining unit or work spindle has a machining axis, while the solid-body joint has several fastening elements and at least one bending element that is fixed via the fastening elements, and the bending element has two area moments of inertia $M1$, $M2$, of which the respective vector $V1$, $V2$ that maps the area moments of inertia $M1$, $M2$ is situated perpendicular to the machining axis, and thus to the work spindle axis. The solid-body joint, contrary to the teaching of the prior art, is not an integral part of the tool mount or the work mount, but instead is connected via the aforesaid fastening elements to the work spindle on the one hand and to the supporting element on the other. The two area moments of inertia $M1$, $M2$ ultimately ensure an extremely stiff coupling of the work spindle. Besides the existing degree of freedom of the solid-body joint about the axis of articulation, the solid-body joint has maximum stiffness with regard to the two aforementioned area moments of inertia $M1$, $M2$ preferably in the context of the other two remaining degrees of freedom, insofar as concerns the rotation. The two vectors $V1$, $V2$ of the two area moments of inertia $M1$, $M2$ are thus essentially perpendicular to each other. A deviation from a right angle is entirely conceivable in regard to the ultimately desired stiffness of the solid-body joint. The area moment of inertia $M1$, $M2$ is determined by the height $H$ and the thickness $d$ of the bending element, while the ratio of the height $h$ to the thickness $d$ is preferably between 0.3 and 0.01, especially between 0.1 and 0.02 or between 0.09 and 0.05.

Advantageously, the machining unit such as the work spindle has a housing with a length $L$ such that the solid-body joint extends for at least 80%, preferably 100% of the length $L$ of the housing. In this way, a maximum stiffness is achieved for the coupling and the parallelness between the supporting axis and the spindle axis. It is also provided that the solid-body joint extends beyond the housing at the end face, and is therefore longer than the length $L$ and extends for 120% of the length $L$ of the housing.

It can be advantageous for the bending element to be configured as a two-piece element, and for the bending elements to be oriented perpendicular to each other, where the first bending element has the area moment of inertia $M1$ and the second bending element has the area moment of inertia $M2$. The respective bending element is characterized by an oblong cross sectional shape with the aforesaid ratio of height $h$ and thickness $d$. The bending element is preferably made from spring steel, because this generally has a larger E modulus and a larger yield strength than sheet metal or cast iron.

In connection with the configuration and arrangement of the invention it can be advantageous for the two bending elements to be configured as separate components, while the respective bending element is fixed by means of two fastening elements each time. The separating of the two bending elements, i.e., the configuring of the bending element as a group of components consisting of several separate bending elements, enables an extremely precise articulation of the work spindle to the supporting element. Furthermore, the respective bending element is significantly more easy and thus economical to fabricate. The same holds for the configuration of the respective mount on the work spindle or on the supporting element. The respective bending element is fixed both at the work spindle and at the supporting element by means of at least two fastening elements. When the bending element is configured with several legs, a corresponding number of fastening elements is provided, ensuring a sufficiently firm seating of the respective leg.

Moreover, it can be advantageous for the actuator to have a kinked and/or bending joint with a bending axis, wherein the bending axis is oriented parallel to the axis of articulation. Since the movement about the solid-body joint or its axis of articulation is a pivot movement of the work spindle, an adapting of the linear actuator to the aforementioned pivoting or circular movement is advantageous to ensure the requisite precision of the pivoting process. To ensure the required precision, the actuator is stiffly or rigidly fastened both to the work spindle and to the supporting element. Thus, advantageously, one degree of freedom for the actuator can be implemented in the area between these two coupling points, i.e., in the area of the motor or transmission shaft.

Furthermore, it can be advantageous for the actuator to have a step motor with a motor shaft and a threaded spindle coupled to the motor shaft in nonrotatable manner. With the coupling of a step motor, a simple and economical drive design is chosen, which at the same time ensures a sufficiently precise positioning of the actuator. The step motor per se can be used for different torques. Taking into account the aforementioned pivoting geometry with the described reduction ratio, its use for a solid-body joint is assured. In order to guarantee the required precision, the motor and spindle shaft need to be joined together in nonrotatable manner.

A manually operated gearbox can also be used as the actuator, such as an eccentric gear or a spindle gear.

Moreover, it can be advantageous for the motor shaft and the threaded spindle to be coupled in nonrotatable manner by a coupling configured as a compensating joint, wherein the coupling has at least two degrees of freedom, so that a radial offset between the motor shaft and the threaded spindle can be compensated. The configuration of the connection site between motor and transmission shaft or threaded spindle ensures a compact design of the overall actuator. With the coupling, the aforementioned rotation rigidity between motor shaft and threaded spindle is preferably guaranteed.

It can be advantageous here for the threaded spindle to be received by one end in a threaded sleeve, and the threaded sleeve is at least indirectly fastened to the supporting element. The ultimately achieved movement of the work spindle corresponds to the relative movement between the threaded spindle and the threaded sleeve. The latter is coupled to the supporting element according to the invention, so that due to the rotation of the threaded spindle a displacement of the latter relative to the threaded sleeve results. Basically, it would also be possible to arrange the threaded spindle on the supporting element and couple the threaded sleeve to the motor shaft.

Finally, it can be advantageous for the threaded spindle to be axially prestressed relative to the threaded sleeve. With the prestressing between threaded spindle and threaded sleeve, this gear element is free of play. Preferably, the threaded spindle lies against the threaded sleeve at the thread side where it already lies by virtue of the gravity of the threaded spindle. Thus, the magnitude of the prestressing only needs to be chosen according to what machining forces are engaging with the work spindle and might possibly cause a loss of the aforementioned abutment of the threaded spindle and the threaded sleeve. Accordingly, the prestressing force should be greater than the engaging machining forces.

It can also be advantageous for the actuator to have a linear scale to determine the actual displacement distance of the threaded spindle relative to the threaded sleeve. The tolerances or deviations between setpoint and actual angle of rotation that may occur with a step motor are preferably eliminated by use of a linear scale. The linear scale is preferably an integral part of the actuator, so that a precise coordination between setpoint and actual movement or stroke of the actuator is possible. Moreover, it is possible to eliminate pitch errors of the thread.

Furthermore, it can be advantageous for the actuator to be situated off center with respect to the length L of the housing at the work piece end of the housing. The actuator constitutes the sole supporting point for the work spindle at the side opposite the solid-body joint. With a coupling or supporting point as close as possible to the point of application of force of the work piece mount, the applied leverage is correspondingly small. On the whole, a rigid support is assured.

The problem is also solved by a lathe with a machine bed, with a tool mount or work piece mount arranged at least indirectly on the machine bed and with a subassembly as described above arranged at least indirectly on the machine bed, wherein the work piece and the tool can be oriented relative to each other by means of the solid-body joint. In a lathe with the above described subassembly the supporting element for example is mounted on the machine bed or it is an integral part of the machine bed, so that an orienting of the relative position between the machining unit and the machine bed, and also as ultimately desired that between the work piece, or the work spindle, and the tool, or tool mount, is assured. Preferably, the supporting element is mounted on the machine bed indirectly by means of an additional translatory bearing, so that the supporting element including the work spindle can be moved by means of a linear motor in the translatory direction relative to the machine bed or the other tool components.

BRIEF DESCRIPTION OF THE DRAWINGS

Further advantages and details of the invention are explained in the patent claims and in the specification, and represented in the figures. There are shown:

FIG. 2b, a detail view from FIG. 2a.

DETAILED DESCRIPTION OF THE INVENTION

Figure 1:
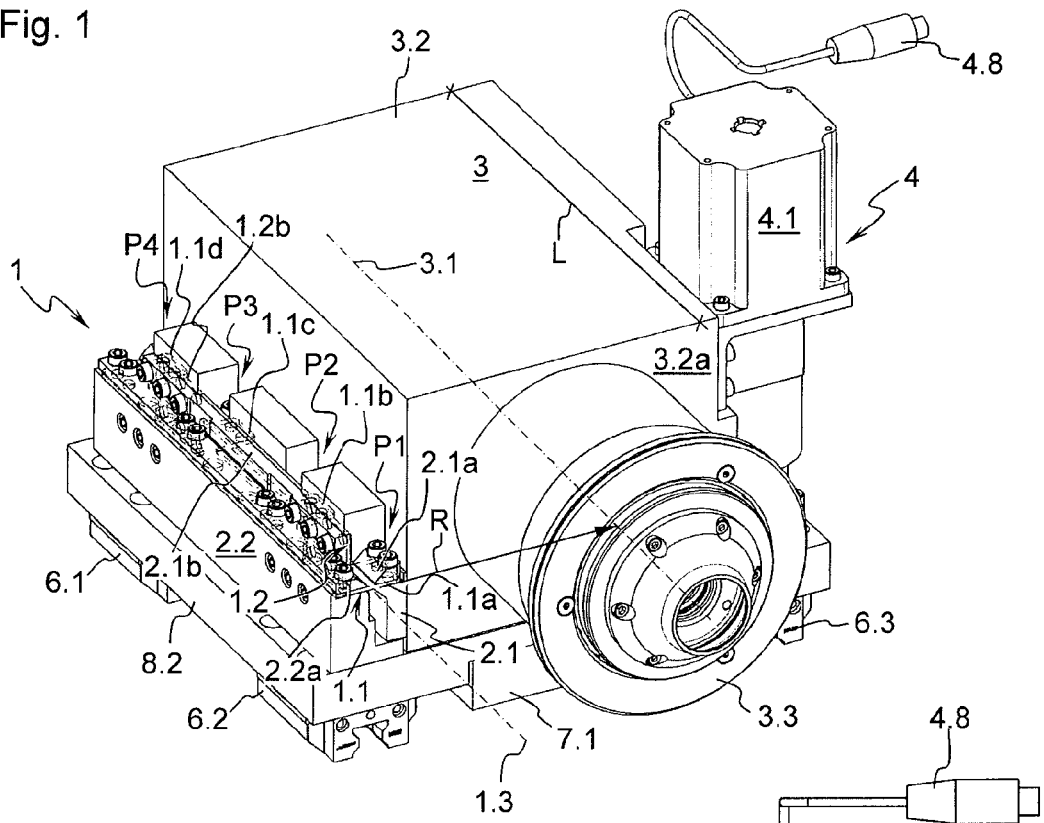
FIG. 1, a perspective view of the subassembly with work spindle, solid-body bearing and actuator.

According to FIG. 1, a work spindle 3 including housing 3.2 and shaft or mount 3.3 is arranged on a supporting element 8.2. The work spindle 3 here is fastened and can pivot by means of a solid-body joint 1 on the supporting element 8.2. The solid-body joint 1 has a theoretical axis of articulation 1.3, which is preferably oriented parallel to a work spindle axis 3.1. The work spindle 3 thus has a pivot radius R, which is defined by the horizontal distance between the axis of articulation 1.3 and the work spindle axis 3.1. Opposite the solid-body joint 1 in regard to the work spindle 3 there is provided an actuator 4, by means of which the work spindle 3 is moved up and down relative to the supporting element 8.2 in a direction perpendicular to the pivot radius R. The lever arm a with which the actuator 4 engages is thus around twice as long as the pivot radius R.

The supporting element 8.2 has bearing shoes 6.1-6.3 on its bottom side, by which the supporting element 8.2 can be moved by means of other parts of a translatory bearing (not shown) in the direction of the work spindle axis 3.1. The drive for this translatory movement is a linear motor, whose primary part 7.1 is embedded in the bottom side of the supporting element 8.2. Moreover, there is provided a translatory axis of movement x, not further shown.

Figure 2A:
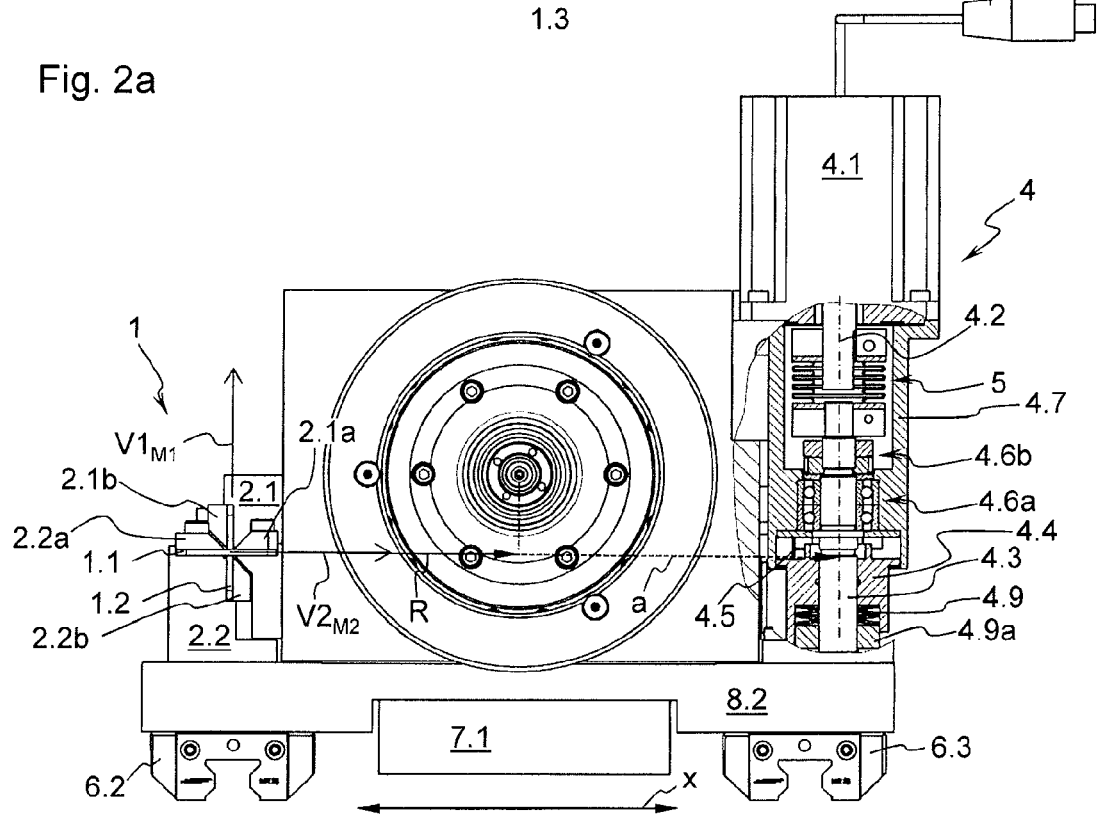
FIG. 2a, a front view of FIG. 1.
Figure 2B:
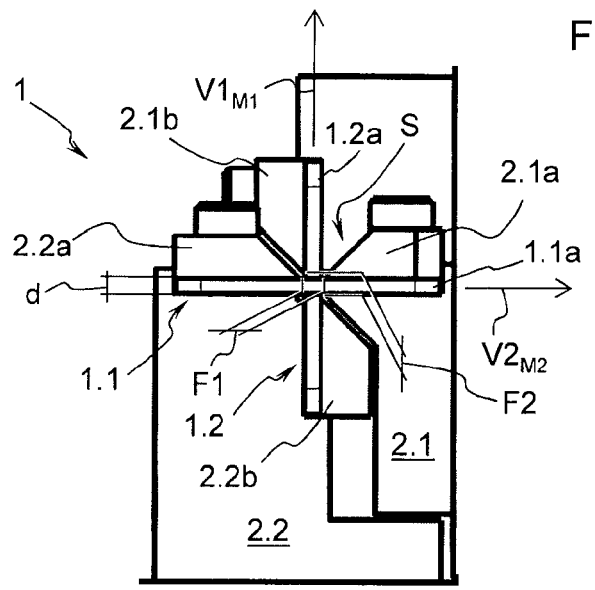

The solid-body joint 1 has two central bending elements 1.1, 1.2, which have four parallel legs 1.1a-1.1d and two perpendicular legs 1.2a, 1.2b with respect to the bearing surface of the supporting element 8.2 per FIGS. 1 and 2b. The four parallel legs 1.1a-1.1d are uniformly distributed over the length L of the housing 3.2 of the work spindle 3 at the four positions P1-P4 and screwed by means of a first fastening element 2.1 to the housing 3.2. At the respective position, the fastening element 2.1 has corresponding recesses. The fastening element 2.1 is equipped with several clamping shoes 2.1a (only the first one is shown), by which the respective parallel leg 1.1a-1.1d is sandwiched with the fastening element 2.1. By a second fastening element 2.2 the free end of the bending element 1.1 is screwed to the supporting element 8.2. The second fastening element 2.2 is also equipped with a clamping shoe 2.2a, by which the free end of the bending element 1.1 is sandwiched with the fastening element 2.2. The second fastening element 2.2 also serves as a bearing for the free end of the second bending element 1.2. It is equipped with a clamping shoe 2.2b. At the spindle side, the second bending element 1.2 is likewise secured by the fastening element 2.1 to the housing 3.2 of the work spindle 3, while a clamping shoe 2.1b is provided to sandwich the free end of the bending element 1.2 to the fastening element 2.1. With regard to the axis of articulation 1.3, the length of the clamping of the four parallel legs 1.1a-1.1d corresponds to the length of the clamping of the two perpendicular legs 1.2a, 1.2b.

Figure 2C:
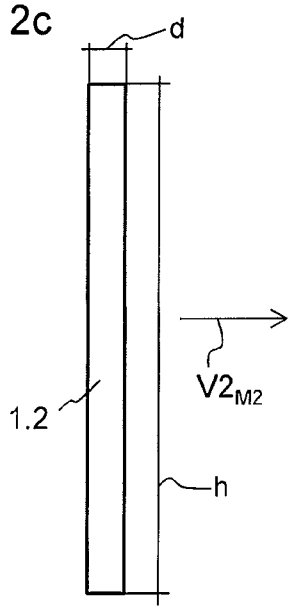
FIG. 2c, a bending element in front view.

The bending element 1.1, 1.2 can either be a single piece or, according to the sample embodiment described here, multiple piece. The respective bending element 1.1, 1.2 is made of spring steel and flat in configuration, or has an oblong, rectangular cross section with thickness d and height h. The ratio of the height h to the thickness d is around 0.07 according to FIG. 2c. Such a ratio is to be found especially for bending elements of sheet metal, while spring steel is obtained by heat treatment of sheet metal. Whereas the first bending element 1.1 of FIG. 2a, 2b is oriented horizontally, the second bending element 1.1 is vertically oriented, and the respective area moment of inertia M1, M2 or the respective vector V1, V2 is vertically or horizontally oriented, respectively. Thus, the two vectors V1, V2 run at right angles to the work spindle axis 3.1 and at the same time are also at right angles to each other. An axial load on the work spindle 3 in the direction of the work spindle axis 3.1 would thus be absorbed substantially by means of the horizontally extending first bending element 1.1 with the area moment of inertia M1, while the weight of the work spindle 3 or a load acting parallel to the force of gravity would be absorbed by means of the second bending element 1.2 with the area moment of inertia M2. The solid-body joint 1 must be designed so that the axis of articulation 1.3 is always maintained parallel to the work spindle axis 3.1.

The stiffness of the solid-body joint 1 and the position of the axis of articulation 1.3 are substantially influenced by the thickness d and the supporting of the respective bending element 1.1, 1.2 or a free length F1, F2 of the bending element 1.1, 1.2, as depicted in FIG. 2b. The free length F1, F2 is determined by the spacing of the opposite fastening elements 2.1, 2.2 or their clamping shoes 2.1a-2.2b. A free length F1, F2 between 1 mm and 10 mm or between 4 mm and 6 mm, preferably 5 mm, is provided. The thickness d of the bending element 1.1, 1.2 is between 1 mm and 6 mm or between 2 mm and 4 mm, preferably 2.5 mm or 3 mm or 3.5 mm. The aforementioned parallel situation of the axis of articulation 1.3 and the work spindle axis 3.1 can be influenced by changing the free length F1, F2 of all or some legs 1.1a-1.2b, and also by the thickness d of the bending element.

The respective clamping shoe 2.1a-2.2b has a bevel S, which as per FIG. 2b assures a minimization of the free length F1, F2 of the opposing clamping shoes 2.2a, 2.1b. Despite the fact that this is not necessary for the clamping shoe 2.1a, all clamping shoes 2.1a-2.2b are identical in shape, in order to guarantee uniform clamping or fastening properties over the entire clamping length L.

According to FIG. 2a, the housing 3.2 of the work spindle 3 is arranged at a distance from the supporting element 8.2, so that an equalizing movement of the work spindle 3 with respect to the pivot radius R is possible, even in the clockwise direction.

As already explained above, the actuator 4 is arranged opposite the solid-body joint 1 with regard to the work spindle 3. The actuator 4 has a step motor 4.1 as the drive unit with a motor shaft 4.2, which is coupled by a coupling 5 to a threaded spindle 4.3. The threaded spindle 4.3 is received at its lower end in a threaded spindle 4.4, which is coupled to the supporting element 8.2 (not further shown). The threaded sleeve 4.4 is prestressed against the threaded spindle 4.3 by a disk spring 4.9 and a prestressing nut 4.91. By means of a bearing arrangement 4.6a, the threaded spindle 4.3 is mounted and can rotate inside a housing 4.7.

The actuator 4 is placed at the front end in regard to the length L of the housing 3.2 of the work spindle 3, so that this, as the bearing point of the work spindle 3, assures the stiffest possible bearing or coupling with respect to the point of force application situated at the end face mount 3.3. Accordingly, the clamping length of the solid-body joint 1 likewise extends across the length L of the housing 3.2, i.e., the first and the respective clamping shoe 2.1a-2.2b sit flush with the front and rear end face 3.2a of the housing 3.2, respectively.

Thanks to the circular pivot motion of the work spindle 3 and the part of the actuator 4 at the spindle side about the axis of articulation 1.3 of the solid-body joint 1, a tilting between the part of the actuator 4 at the spindle side and the threaded sleeve 4.4 fastened to the supporting element 8.2 is absolutely necessary.

Since the circular pivoting motion of the work spindle 3 results in both a desired height offset of the work spindle 3 and an offset in the direction of the axis of movement x, the latter quantity must be factored in when calculating the position of the work spindle 3 or the work spindle axis 3.1.

The coupling 5 constitutes a nonrotatable connection between the motor shaft 4.2 and the threaded spindle 4.3. It is also designed as a compensating joint and ensures a radial offset between the motor shaft 4.2 and the threaded spindle 4.9.

The motor is actuated by a control line 4.8. The bearing arrangement 4.6a is prestressed by means of a screw arrangement 4.6b inside the housing 4.7.

Figure 3:
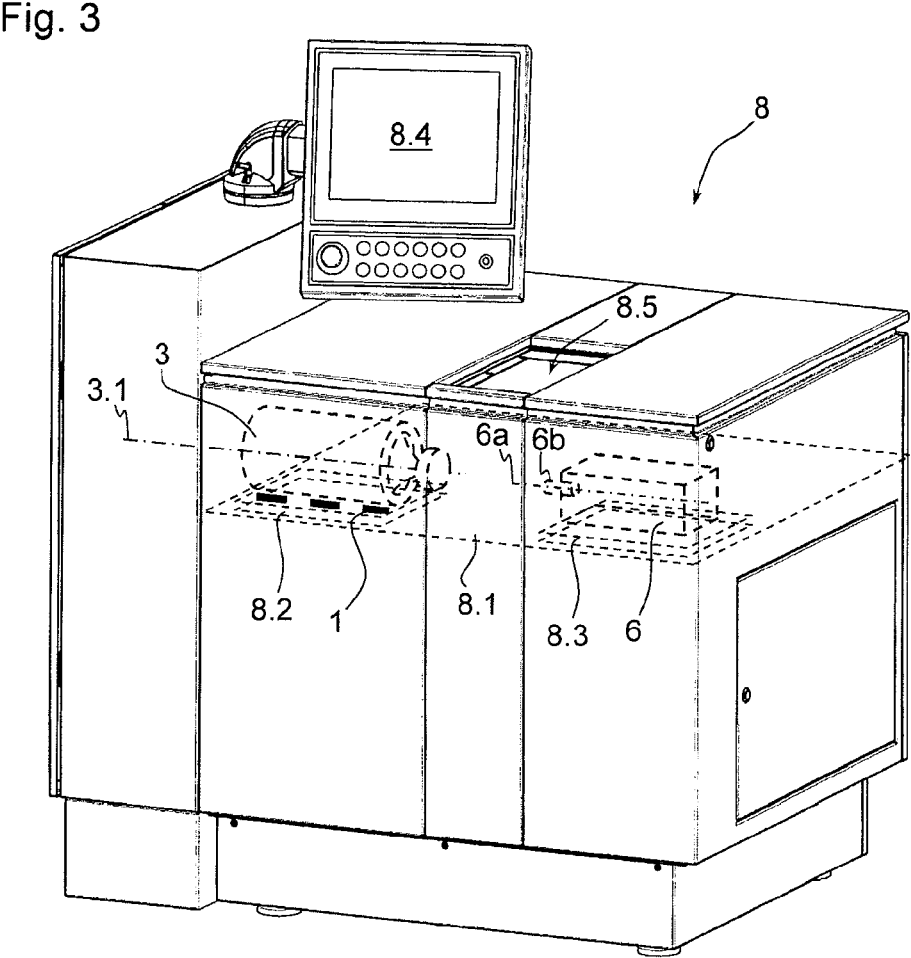
FIG. 3, a perspective view of a lathe.

According to FIG. 3, the above described subassembly is part of a lathe 8. The work spindle 3 is mounted and can pivot by means of the solid-body joint 1 on the supporting element 8.2. The work spindle 3 as well as a tool mount 6 with center axis 6a are mounted on a common machine bed 8.1. The tool mount 6 is designed as a linear motor with a turning tool 6b coupled to it and mounted so that it can oscillate by means of a further supporting element 8.3 on the machine bed 8.1. The center axis 6a runs through a tip of the turning tool 6b. By means of the solid-body joint 1, the work spindle 3 and the tool mount 6 can be oriented in height relative to each other, i.e., the work spindle axis 3.1 and the center axis 6a can be oriented, preferably coaxially, to each other.

The lathe so configured has a control panel 8.4 and a loading port 8.5.

LIST OF REFERENCE SYMBOLS 1 solid-body joint
1.1 bending element
1.2 bending element
1.1a parallel leg
1.1b parallel leg
1.1c parallel leg
1.1d parallel leg
1.2a perpendicular leg
1.2b perpendicular leg
1.3 axis of articulation
2.1 fastening element
2.1a fastening element, clamping shoe
2.1b fastening element, clamping shoe
2.2 fastening element
2.2a fastening element, clamping shoe
2.2b fastening element, clamping shoe
3 machining unit, work spindle, tool mount
3.1 machining axis, work spindle axis
3.2 housing
3.2a end wall
3.3 shaft, mount
4 actuator
4.1 step motor
4.2 motor shaft
4.3 threaded spindle
4.4 threaded spindle
4.5 linear scale
4.6a bearing arrangement
4.6b screw arrangement
4.7 housing
4.8 control line
4.9 disk spring
4.9a prestressing nut
5 kinked and/or bending joint, coupling
6 tool mount, work mount
6a center axis
6b turning tool
6.1 bearing shoe
6.2 bearing shoe
6.3 bearing shoe
7.1 primary part
8 lathe
8.1 machine bed
8.2 supporting element
8.3 supporting element
8.4 control panel
8.5 loading port
a lever arm d thickness
F1 free length
F2 free length
M1 area moment of inertia
M2 area moment of inertia
L length
PI position
P2 position
P3 position
P4 position
R pivot radius
S bevel
V1 vector
V2 vector
x axis of movement

What is claimed is:

1. A subassembly, consisting of: a supporting element of a machine bed of a lathe for plastic spectacle lenses and a machining unit arranged on the supporting element for the machining of the spectacle lenses, wherein a solid-body joint is provided, by which the machining unit is pivotably arranged on the supporting element, wherein the solid-body joint has an axis of articulation and a pivot axis R and serves for orienting of a relative position between the machining unit and the supporting element, and wherein the machining unit is arranged between the solid-body joint and the actuator in regard to the direction of the pivot axis R and can move by the actuator in a direction perpendicular to the pivot axis R.

2. The subassembly according to claim 1, wherein the machining unit is coupled to an actuator, by which movement about the solid-body joint is possible.

3. The subassembly according to claim 2, wherein the actuator has a step motor with a motor shaft and a transmission spindle coupled to the motor shaft in nonrotatable manner.

4. The subassembly according to claim 3, wherein the motor shaft and the threaded spindle are coupled in nonrotatable manner by a coupling configured as a compensating joint, wherein the coupling has at least two degrees of freedom, so that a tilting between the motor shaft and the threaded spindle is possible.

5. The subassembly according to claim 3, wherein the threaded spindle is received by one end in a threaded sleeve, and the threaded sleeve is at least indirectly fastened to the supporting element.

6. The subassembly according to claim 5, wherein the threaded spindle is axially prestressed relative to the threaded sleeve.

7. The subassembly claim 6, wherein the actuator has a linear scale to determine an actual displacement distance of the threaded spindle relative to the threaded sleeve.

8. The subassembly according to claim 2, wherein the actuator is situated off center with respect to the length L of the housing at the work piece end of the housing.

9. The subassembly according to claim 1, wherein the machining unit has a machining axis, while the solid-body joint has several fastening elements and at least one bending element that is fixed via the fastening elements, and the bending element has two area moments of inertia M1, M2, of which the respective vector V1, V2 that maps the area moments of inertia M1, M2 is situated perpendicular to the machining axis.

10. The subassembly according to claim 9, wherein the bending element is configured as a two-piece element, wherein the bending elements are oriented perpendicular to each other, while the first bending element has the area moment of inertia M1 and the second bending element has the area moment of inertia M2.

11. The subassembly according to claim 10, wherein the two bending elements are configured as separate components, while the respective bending element is fixed by means of two fastening elements each time.

12. The subassembly according to claim 1, wherein the machining unit has a housing with a length L such that the solid-body joint extends for at least 80% of the length L of the housing.

13. A lathe for plastic spectacle lenses, comprising: a machine bed, with a subassembly according to claim 1 arranged at least indirectly on the machine bed, the subassembly having a tool mount or work piece mount and the machine bed having the work piece mount or the tool mount, wherein the work piece supported in the work piece mount and the tool supported in the tool mount can be oriented relative to each other by the solid-body joint.

14. The subassembly according to claim 1, wherein the machining unit has a machining axis, while the solid-body joint has several fastening elements and at least one bending element that is fixed via the fastening elements, and the bending element has two area moments of inertia M1, M2, of which the respective vector V1, V2 that maps the area moments of inertia M1, M2 is situated perpendicular to the machining axis, wherein the machining unit has a housing with a length L such that the solid-body joint extends for at least 80% of the length L of the housing, and wherein the bending element is configured as a two-piece element, wherein the bending elements are oriented perpendicular to each other, while the first bending element has the area moment of inertia M1 and the second bending element has the area moment of inertia M2.

15. The subassembly according to claim 14, wherein the two bending elements are configured as separate components, while the respective bending element is fixed by means of two fastening elements each time, wherein the actuator has a step motor with a motor shaft and a transmission spindle coupled to the motor shaft in nonrotatable manner, and wherein the motor shaft and the threaded spindle are coupled in nonrotatable manner by a coupling configured as a compensating joint, wherein the coupling has at least two degrees of freedom, so that a tilting between the motor shaft and the threaded spindle is possible.

16. The subassembly according to claim 15, wherein the threaded spindle is received by one end in a threaded sleeve, and the threaded sleeve is at least indirectly fastened to the supporting element, and wherein the threaded spindle is axially prestressed relative to the threaded sleeve.

17. The subassembly according to claim 16, wherein the actuator has a linear scale to determine an actual displacement distance of the threaded spindle relative to the threaded sleeve, and wherein the actuator is situated off center with respect to the length L of the housing at the work piece end of the housing.

18. A subassembly, consisting of: a supporting element of a machine bed of a lathe for plastic spectacle lenses and a machining unit arranged on the supporting element for the machining of the spectacle lenses, wherein a solid-body joint is provided, by which the machining unit is arranged and can pivot on the supporting element, wherein the machining unit has a machining axis, while the solid-body joint has several fastening elements and at least one bending element that is fixed via the fastening elements, and the bending element has two area moments of inertia M1, M2, of which the respective vector V1, V2 that maps the area moments of inertia M1, M2 is situated perpendicular to the machining axis.

19. A subassembly, consisting of: a supporting element of a machine bed of a lathe for plastic spectacle lenses and a machining unit arranged on the supporting element for the machining of the spectacle lenses, wherein a solid-body joint is provided, by which the machining unit is arranged and can pivot on the supporting element, wherein the machining unit is coupled to an actuator, by which movement about the solid-body joint is possible, and wherein the actuator has a step motor with a motor shaft and a transmission spindle coupled to the motor shaft in nonrotatable manner.

* * * * *